United States Patent
Raikio et al.

(10) Patent No.: US 6,912,978 B2
(45) Date of Patent: Jul. 5, 2005

(54) AIR FEEDING ARRANGEMENT FOR PISTON ENGINE

(75) Inventors: Tero Raikio, Vaasa (FI); Carl-Erik Rösgren, Vikby (FI)

(73) Assignee: Wartsila Technology Oy AB, Helsinki (FI)

(*) Notice: Subject to any disclaimer, the term of this patent is extended or adjusted under 35 U.S.C. 154(b) by 50 days.

(21) Appl. No.: 10/371,182

(22) Filed: Feb. 22, 2003

(65) Prior Publication Data

US 2004/0163611 A1 Aug. 26, 2004

(51) Int. Cl.[7] .................................................. F02B 47/00
(52) U.S. Cl. .................................. 123/25 R; 123/25 A
(58) Field of Search ............................. 123/25 R, 25 A, 123/25 E, 25 G, 25 J, 25 K, 25 L, 25 M, 25 N, 25 Q

(56) References Cited

U.S. PATENT DOCUMENTS 4,708,120 A 11/1987 Mann
5,809,981 A 9/1998 Berg-Sonne
6,145,498 A * 11/2000 Packard et al. ........... 123/25 A
6,196,165 B1 3/2001 Rósen et al.

FOREIGN PATENT DOCUMENTS

| EP | 1 205 659 | 5/2002 |
| GB | 1 505 683 | 3/1978 |
| JP | 8-109853 | 4/1996 |

* cited by examiner

Primary Examiner—Noah P. Kamen
(74) Attorney, Agent, or Firm—John Smith-Hill; Smith-Hill and Bedell

(57) ABSTRACT

A piston engine includes a feed channel for conducting combustion air to the engine, a collecting container for receiving combustion air from the feed channel, and a feed pipe for conducting combustion air from the collecting container to a cylinder of the engine. Moistening fluid is introduced into the combustion air at a location upstream of the feed pipe and a droplet separator removes droplets of moistening fluid from air flowing through the feed pipe.

14 Claims, 2 Drawing Sheets

AIR FEEDING ARRANGEMENT FOR PISTON ENGINE

BACKGROUND OF THE INVENTION

The invention relates to an air feeding arrangement for a piston engine.

At high combustion temperatures nitrogen oxides (NOx) are produced in the piston engine cylinder and are conducted with the exhaust gases into the ambient air. Due to the detrimental effects of nitrogen oxide emissions on the environment it is therefore an aim to minimize these emissions.

It is known that introducing water into the combustion process with combustion air reduces the production of nitrogen oxides. This phenomenon is, among other things, based on the cooling effect of the water.

Adding water to the combustion air before the air is introduced into the cylinder is technically less complicated than direct injection of water into the cylinder because the cylinder is at high pressure. To reach a sufficiently high humidity level requires, however, plenty of water. As regards the durability of engine structures and the control of the combustion process, it would be advantageous to remove the non-evaporated water before combustion air is fed into the engine cylinder, as the water fed in this manner is typically in the form of relatively large droplets.

The present invention may be used to provide an air supply arrangement minimizing prior art problems. Especially the present invention may be used to provide an air supply arrangement, by which the humidification of the combustion air is performed advantageously and at the same time effectively.

SUMMARY OF THE INVENTION

A piston engine embodying the present invention comprises a feed channel for combustion air, through which combustion air is fed into the engine, i.e. into a collecting container or air receiver, to which the channel for combustion air is connected and from which combustion air is distributed further to each cylinder of the engine, a feed pipe for each engine cylinder, by which feed pipe combustion air is conducted from the collecting container to each engine cylinder, and means for introducing moistening fluid into the combustion air. In addition, the arrangement comprises at least one droplet separator arranged in the flow direction of the combustion air after the collecting container. Preferably, this is realized by arranging a droplet separator for separating liquid moistening fluid from the combustion air in each feed pipe for combustion air.

The means for introducing moistening fluid into the combustion air may comprise a water tank or the like, with which the combustion air collecting container is in flow communication. This is preferably realized by providing the arrangement with a return duct for separated water.

The structure is made advantageous and reliable by arranging the droplet separator in conjunction with a connecting piece connecting the cylinder head of the engine and the collecting container. Thus the droplet separator is easy to maintain or replace. Preferably, the droplet separator is positioned by making use of joint members and/or in conjunction with the joint members of the connecting piece.

The means for introducing moistening fluid into the combustion air may comprise one or several nozzles to introduce moistening fluid into the combustion air after a turbocharger, but before the collecting container. In addition, the arrangement comprises at least one heat exchanger for heating or cooling the combustion air.

BRIEF DESCRIPTION OF THE DRAWINGS

In the following the invention is described by way of example with reference to the attached drawings, in which.

DETAILED DESCRIPTION

Figure 1:
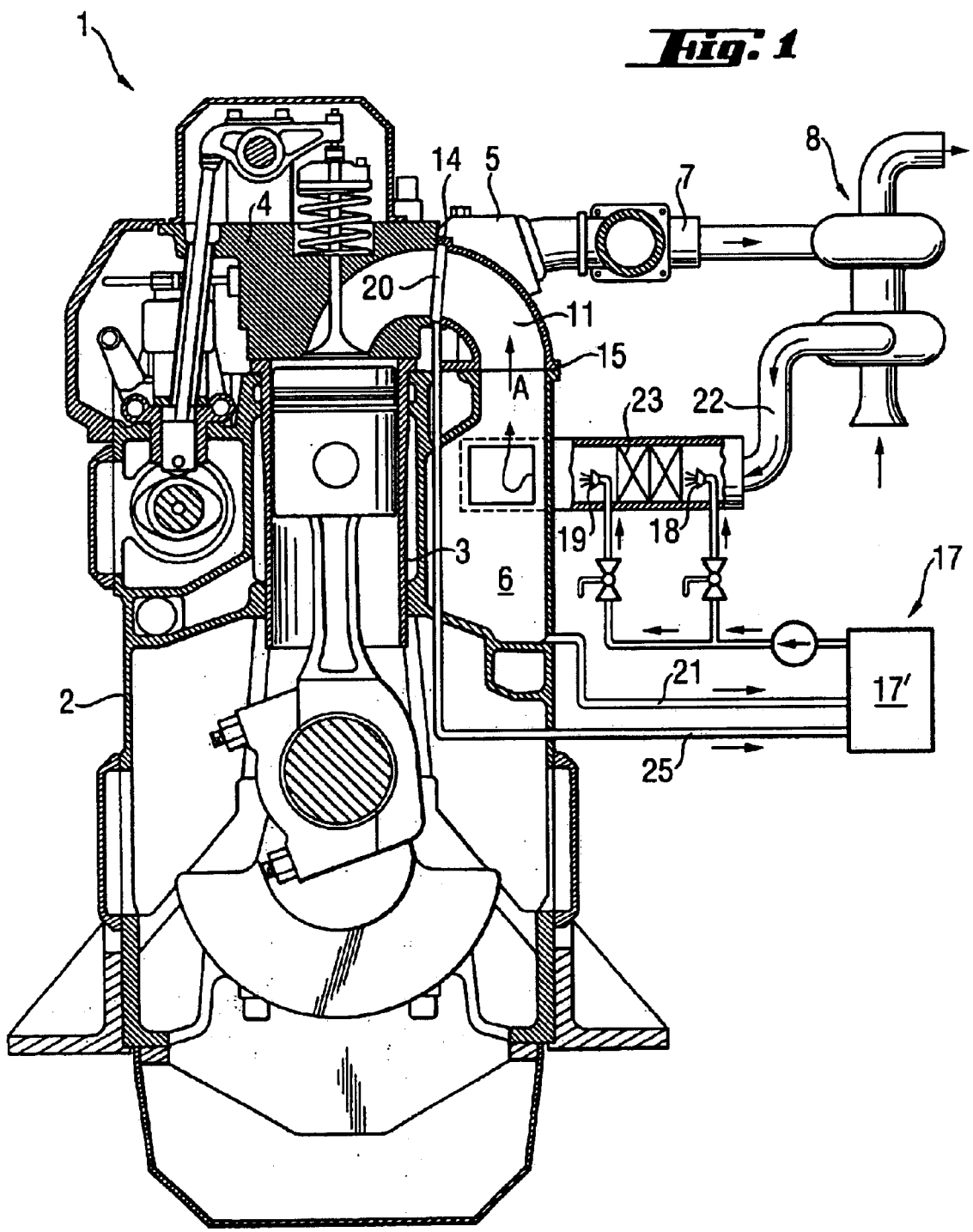
FIG. 1 shows schematically a piston engine embodying the present invention.

In the drawings the reference number 1 denotes a piston engine embodying the invention. The engine shown in FIG. 1 comprises an engine block 2, cylinders 3 and cylinder heads 4. The engine may naturally comprise a plurality of cylinders and each of them may have a cylinder head of its own. The engine also includes an exhaust manifold 7, which is connected to a turbocharger 8. Further, the engine comprises a collecting container or air receiver 6 for combustion air, which is arranged in the engine block 2 and into which the turbocharger 8 feeds combustion air. In addition, each cylinder 3 in the engine is provided with a connecting piece 5 for various pressure mediums, by means of which connecting piece it is possible to arrange e.g. the cooling circulation of the cylinder head and the gas exchange of the cylinder. Such may be realized as shown for instance in the U.S. Pat. No. 5,213,068.

The connecting piece 5 is provided with a feed pipe 11 for conducting the combustion air from the collecting container 6 of the engine block 2 via the cylinder head 4 to the cylinder 3. The feed pipe 11 for combustion air is shaded in FIG. 2 and the flow direction is shown by arrow A. In this embodiment the connecting piece 5 has also an exhaust gas channel 12 conducting the exhaust gases from the cylinder 3 via the cylinder head 4 to the exhaust pipe 7. In addition, the connecting piece 5 may include a cooling water channel 13 conducting the cooling water of the cylinder 3 for recycling via the cylinder head 4 and further to a collecting channel for cooling water located in the engine block 2. The connecting piece 5 is provided with joint members 14 and 15, shown as flanges, by means of which the connecting piece 5 is on the one hand connected to the cylinder head 4 and on the other hand to the engine block 2, which are provided with respective joint members.

The engine comprises a turbocharger 8, which is connected via a feed pipe or channel 22 for combustion air to the collecting container 6, usually at other end of the collecting container 6. In conjunction with the engine there are also means 17, including a water tank 17' or the like, for introducing moistening fluid into the combustion air. The feed channel 22 is provided with nozzles 18, 19 for injecting water into the combustion air. Also, one or several heat exchangers 23 are installed in the feed channel for either heating or cooling the combustion air, as the situation requires. From the collecting container 6 combustion air is conducted to each cylinder. Therefore the arrangement comprises a separate feed channel 11 for combustion air for each cylinder arranged in the joint member 15, the channel 11 being connected to the collecting container 6.

While the engine is running, water is injected into the combustion air by means of the nozzles 18, 19 and, if needed, heat is supplied to or removed from the combustion air by means of the heat exchangers 23. Air flows from the feed channel 22 into the collecting container 6 and the air flow entrains water droplets as well. In the collecting container 6 some of the water may separate to the bottom thereof, e.g. due to reduced flow speed. The actual separation of water from the combustion air does not take place until just before the combustion air is conducted into the cylinder. For that purpose each feed pipe 11 for combustion air is provided with a droplet separator 20 for separating moistening fluid in liquid form from the combustion air.

The droplet separator 20 may be arranged so that the separated water flows or drains down to the collecting container 6 for combustion air. The collecting container 6 for combustion air is in flow communication with the tank 17'. This flow connection is provided in order to recirculate the separated water and to inject it again into the combustion air. For this purpose the air supply arrangement comprises a return duct 21 for separated water forming the flow connection between the collecting container 6 and the water tank 17'.

The droplet separator 20 may also be arranged so that the separated water flows alternatively or in addition down via a separate channel 25 to the water tank 17'. Depending on the situation, the assembly may comprise either a return duct 21 connecting the collecting container 6 and the water tank 17', or a separate channel 25 connecting the droplet separator 20 and the water tank 17'. The engine may also be provided with both channels at the same time, e.g. in case the amount of water to be separated is very large.

The arrangement is made particularly advantageous, when the droplet separator 20 is arranged in conjunction with the connecting piece 5 connecting the cylinder head 4 of the engine and the collecting container 6, whereby the fastening of the droplet separator is both simple and reliable. The air supply arrangement provides an efficient air treatment and humidification process, as water can be utilized more freely than in conventional arrangements and on the other hand the separation of the used water as a liquid is efficient. The channel 22 for combustion air is typically located at one end of the collecting container 6 and water is injected into the combustion air before it reaches the collecting container 6, whereby the dwell time of the water in the combustion air before the water separation is prolonged. This way also the humidification of the combustion air is more efficient. A predetermined amount of water may be retained in the collecting container, some of which is also vaporized into the combustion air.

Figure 2:
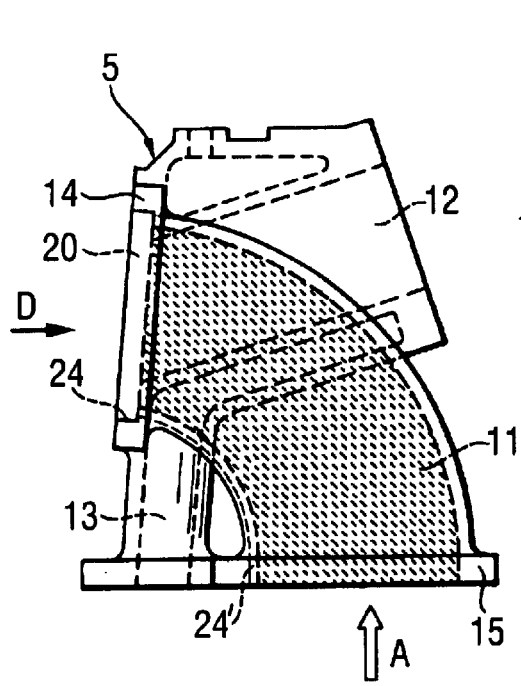
FIG. 2 shows schematically a detail of the piston engine shown in FIG. 1.
Figure 3:
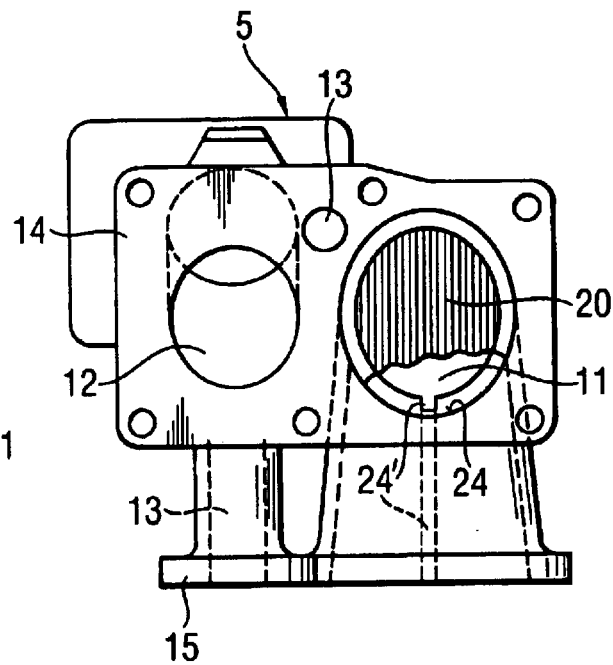
FIG. 3 shows a detail of FIG. 2 seen from the direction of arrow D.

FIGS. 2 and 3 show in more detail the connecting piece 5 connecting the cylinder head 4 of the engine and the collecting container 6. The flange 14 is provided with a recess 24 having a larger diameter than the flow passage 11. The recess 24 receives the droplet separator 20 so that the droplet separator 20 is located or held between the flange 14 and the joint or mating surface of the cylinder head 4. A groove 24' or an equivalent channel extends from the recess 24 to the flange 15 for securing the flow of the separated water to the collecting container 6 so that the air flowing to the cylinder does not substantially hamper or disturb the returning of the separated water. FIG. 3 shows the connecting piece 5 of FIG. 2 seen from the direction of arrow D. As shown in FIG. 3, the area of the droplet separator 20 is greater than the flow area, and thus it fills the recess 24. Preferably, this kind of a construction is used when the aim is to conduct the separated water into the collecting container 6. If the engine comprises a separate channel 25, as described above, the channel 25 is connected to the droplet separator 20 instead of the groove 24'.

Figure 4:
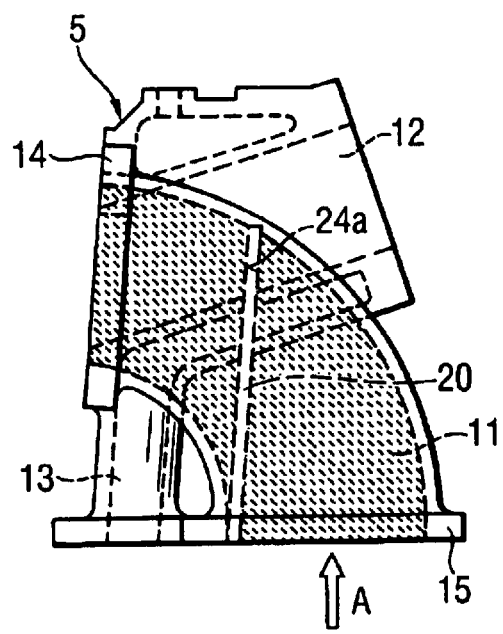
FIG. 4 shows another embodiment of the detail according to FIG. 2.

FIG. 4 shows another possible location for the droplet separator 20 in conjunction with the connecting piece 5. Here the droplet separator is arranged in connection with the flange 15 of the connecting piece 5. A recess or groove 24a is provided on the interior surface of the feed pipe 11. The groove 24a is disposed at a suitable angle in relation to the flange 15 so that the droplet separator 20 can be installed in the groove by inserting it into the feed pipe 11 for combustion air. The groove receives the droplet separator and holds it in its place. In this manner the area of the droplet separator can be made larger than in the case shown in FIG. 2 thus reducing its flow resistance. The droplet separator is constructed so that it is located in the proper position when the connecting piece 5 is attached to the collecting container 6.

By adjusting the state and humidity of the combustion air it is possible to influence the combustion process and the composition and amount of combustion products in a manner known per se. The main advantage is the reduction of nitrogen oxide emissions.

Only a few embodiments of the invention are shown in the above-mentioned figures. The droplet separator may in some cases be arranged in the means installed in conjunction with the cylinder head or the collecting container instead of in the connecting piece. Thus the invention is not limited to the above-described embodiments, but several other modifications are conceivable in the scope of the appended claims.

What is claimed is:

1. A piston engine comprising:
    a feed channel for conducting combustion air to the engine,
    a collecting container for receiving combustion air from the feed channel,
    a plurality of feed nines for conducting combustion air from the collecting container to respective cylinders of the engine,
    a means for introducing moistening fluid into the combustion air at a location upstream of the feed pipe, and
    a plurality of droplet separators associated with the feed pipes respectively for removing droplets of moistening fluid from air flowing through the respective feed pipes.

2. A multi-cylinder piston engine according to claim 1, wherein the plurality of droplet separators are located in the feed pipes respectively for removing liquid moistening fluid from the combustion air flowing through the respective feed pipes.

3. A piston engine according to claim 1, wherein the means for introducing moistening fluid into the combustion air comprises a water tank and each droplet separator is in flow communication with the water tank.

4. A piston engine according to claim 3, wherein each droplet separator is in flow communication with the water tank via a return duct for separated liquid.

5. A piston engine according to claim 1, wherein the means for introducing moistening fluid into the combustion air comprises a water tank and the collecting container is in flow communication with the water tank via a return duct for separated liquid.

6. A piston engine according to claim 1, comprising a turbocharger connected to the feed channel for supplying combustion air to the collecting container and wherein the means for introducing moistening fluid into the combustion air comprises at least one nozzle located in the feed channel between the turbocharger and the collecting container.

7. A piston engine according to claim 1, comprising at least one beat exchanger for heating or cooling the combustion air.

8. A piston engine according to claim 1, wherein the engine includes a cylinder head and a plurality of connecting pieces that define the feed pipes respectively and are attached to the cylinder head and the collecting container, and the droplet separators are installed in conjunction with the connecting pieces respectively.

9. A piston engine comprising:
- a feed channel for conducting combustion air to the engine,
- a collecting container for receiving combustion air from the feed channel,
- a feed pipe for conducting combustion air from the collecting container to a cylinder of the engine,
- a means for introducing moistening fluid into the combustion air at a location upstream of the feed pipe, and
- a droplet separator for removing droplets of moistening fluid from air flowing through the feed pipe,
- and wherein the engine includes a cylinder head and a connecting piece that defines the feed pipe and is attached to the cylinder head and the collecting container, and the droplet separator is installed in conjunction with the connecting piece.

10. A piston engine according to claim 9, wherein the connecting piece includes joint members for attaching the connecting piece to the cylinder head and the collecting container and the droplet separator is installed by making use of at least one of said joint members.

11. A piston engine according to claim 10, wherein the droplet separator is at least partially located in at least one of said joint members.

12. A piston engine according to claim 9, wherein the means for introducing moistening fluid into the combustion air comprises a water tank and the collecting container is in flow communication with the water tank via a return duct for separated liquid.

13. A piston engine according to claim 9, comprising a turbocharger connected to the feed channel for supplying combustion air to the collecting container and wherein the means for introducing moistening fluid into the combustion air comprises at least one nozzle located in the feed channel between the turbocharger and the collecting container.

14. A piston engine according to claim 9, comprising at least one beat exchanger for heating or cooling the combustion air.

* * * * *

UNITED STATES PATENT AND TRADEMARK OFFICE
CERTIFICATE OF CORRECTION

PATENT NO. : 6,912,978 B2
DATED : July 5, 2005
INVENTOR(S) : Tero Raikio and Carl-Erik Rösgren It is certified that error appears in the above-identified patent and that said Letters Patent is hereby corrected as shown below:

Column 4,
Line 34, "nines" should be deleted and replaced with -- pipes --.
Line 65, "beat" should be deleted and replaced with -- heat --.

Column 6,
Line 21, "beat" should be deleted and replaced with -- heat --.

Signed and Sealed this

Thirtieth Day of August, 2005

JON W. DUDAS
*Director of the United States Patent and Trademark Office*